(12) United States Patent
Glenn

(10) Patent No.: US 6,266,093 B1
(45) Date of Patent: Jul. 24, 2001

(54) COLOR VIDEO CAMERA METHOD AND SYSTEM

(75) Inventor: William E. Glenn, Ft. Lauderdale, FL (US)

(73) Assignee: Florida Atlantic University, Boca Raton, FL (US)

( * ) Notice: Subject to any disclaimer, the term of this patent is extended or adjusted under 35 U.S.C. 154(b) by 0 days.

(21) Appl. No.: 09/362,603

(22) Filed: Jul. 28, 1999

Related U.S. Application Data

(63) Continuation-in-part of application No. 09/152,395, filed on Sep. 14, 1998
(60) Provisional application No. 60/094,499, filed on Jul. 29, 1998, and provisional application No. 60/094,500, filed on Jul. 29, 1998.

(51) Int. Cl.[7] ................................................. H04N 7/01
(52) U.S. Cl. .......................... 348/448; 348/446; 348/450; 348/453
(58) Field of Search ..................................... 348/443, 448, 348/449, 450, 451, 452, 458, 446, 453, 455

(56) References Cited

U.S. PATENT DOCUMENTS

| | | | |
|---|---|---|---|
| 4,149,182 | 4/1979 | Yamanaka et al. | 358/43 |
| 4,425,581 | 1/1984 | Schweppe et al. | 358/148 |
| 4,598,309 | * 7/1986 | Casey | 358/11 |
| 4,612,567 | * 9/1986 | Pritchard | 358/11 |

(List continued on next page.)

FOREIGN PATENT DOCUMENTS

WO98/16068   4/1988   (WO) .

OTHER PUBLICATIONS

W.E. Glenn, and J. W. Marcinka, "The Development of 1080×1920 Pixel Color CCD Camera Progressively Scanned At 60 Frames Per Second," SMPTE Technical Conference, Los Angeles, CA, Oct. 9, 1996.

W.E. Glenn, and J.W. Marcinka, "1920×1080 Pixel Color Camera With A Progressive Scan Output At 60 FPS," SMPTE Technical Conference, New York, NY, Nov. 22, 1997.

Glenn et al. "Subband Coding Compression System For Program Production", presented at the 136th SMPTE Technical Conference in Los Angeles, CA, in Oct., 1994.

Glenn et al. "Simple Scalable Video Compression Using 3–D Subband Coding", presented at the SMPTE Advanced Television and Electronic Imaging Conference in San Francisco, CA, on Feb. 11, 1995, and published in the Mar., 1996 SMPTE Journal.

W.E. Glenn, K.G. Glenn, and T.L. Glatt, "Logarithmic A/D Converters Used in Video Signal Processing Systems," presented at the 132nd SMTE Technical Conference, New York, Oct. 1990. Reprinted in SMPTE Journal vol. 101/5:329–333, May 1992.

(List continued on next page.)

*Primary Examiner*—Reinhard J. Eisenzopf
*Assistant Examiner*—Brian P. Yenke
(74) *Attorney, Agent, or Firm*—Martin Novack

(57) ABSTRACT

A method for generating interlaced video signals representative of color images of a scene includes the following steps: deriving a progressively scanned luminance signal representative of the scene at a first frame rate; deriving interlaced scanned color component signals and a color-derived luminance component representative of the scene; high pass filtering and scan converting the luminance signal to obtain an interlaced detail luminance component; low pass filtering the interlaced color component signals and color-derived luminance component to obtain interlaced chrominance output signals and an interlaced low pass luminance component; and combining the detail luminance component and the low pass luminance component to obtain an interlaced luminance output signal.

6 Claims, 1 Drawing Sheet

U.S. PATENT DOCUMENTS

| | | | |
|---|---|---|---|
| 4,636,857 | | 1/1987 | Achiha et al. ........................ 358/140 |
| 4,639,763 | * | 1/1987 | Willis .................................... 358/11 |
| 4,652,909 | | 3/1987 | Glenn .................................... 358/41 |
| 4,667,226 | | 5/1987 | Glenn .................................... 358/41 |
| 4,701,783 | | 10/1987 | Glenn .................................... 368/12 |
| 4,733,299 | | 3/1988 | Glenn .................................... 358/140 |
| 4,823,186 | | 4/1989 | Muramatsu ........................... 358/43 |
| 4,876,591 | | 10/1989 | Muramatsu ........................... 358/43 |
| 5,025,394 | | 6/1991 | Parke .................................... 364/518 |
| 5,221,963 | | 6/1993 | Hashimoto et al. .................. 348/234 |
| 5,257,103 | * | 10/1993 | Vogeley et al. ...................... 358/140 |
| 5,260,786 | * | 11/1993 | Kawashima .......................... 358/140 |
| 5,325,125 | | 6/1994 | Naimpally et al. ................... 348/402 |
| 5,337,089 | * | 8/1994 | Fish ...................................... 348/446 |
| 5,414,465 | | 5/1995 | Kodama et al. ...................... 348/236 |
| 5,534,935 | * | 7/1996 | Kawai ................................... 348/448 |
| 5,568,193 | | 10/1996 | Kawahara ............................. 348/222 |
| 5,596,418 | | 1/1997 | Strolle et al. ......................... 386/9 |
| 5,717,466 | * | 2/1998 | Pan ....................................... 348/450 |
| 5,754,245 | * | 5/1998 | Yoshida ................................ 348/451 |
| 5,781,241 | | 7/1998 | Donovan ............................... 348/441 |
| 5,786,871 | | 7/1998 | Penney .................................. 348/609 |
| 5,838,394 | * | 11/1998 | Kajimoto .............................. 348/717 |
| 5,936,676 | * | 8/1999 | Ledinh .................................. 348/452 |
| 5,978,023 | * | 11/1999 | Glenn .................................... 348/234 |
| 6,040,868 | * | 3/2000 | Jun ........................................ 348/448 |
| 6,100,929 | * | 8/2000 | Ikeda et al. ........................... 348/262 |

OTHER PUBLICATIONS

Glenn et al. "Subband Coding Compression System For Program Production", presented at the 136th SMPTE Technical Conference in Los Angeles, CA, in Oct., 1994.

Glenn et al. "Simple Scalable Video Compression Using 3–D Subband Coding", presented at the SMPTE Advanced Television and Electronic Imaging Conference in San Francisco, CA, on Feb. 11, 1995, and published in the Mar., 1996 SMPTE Journal.

W.E. Glenn, K.G. Glenn, and T.L. Glatt, "Logarithmic A/D Converters Used in Video Signal Processing Systems," presented at the 132nd SMTE Technical Conference, New York, Oct. 1990. Reprinted in SMPTE Journal vol. 101/5:329–333, May 1992.

D.C. Livingston, "Colorimetric Analysis of the NTSC Color Television Systems," Proceedings of the IRE, 42:138–150, Jan. 1954.

Yuichi Ninomiya, et al., "An HDTV Broadcasting System Utilizing a Bandwidth Compression Technique—MUSE," IEEE Transactions on Broadcasting, vol. BC–33/4:130–160, Dec. 1987.

V.A. Billock, and T.H. Harding, "The Number and Tuning of Channels Responsible for the Independent Detection of Temporal Modulation,"ARVO, Investigative Ophthalomogy & Visual Science, Annual Meeting Abstracts, 32:840, Mar. 15, 1991.

W.E. Glenn, "Digital Image Compression Based On Visual Perception And Scene Properties", Presented at the 133rd SMPTE Technical Conference in Los Angeles on Oct. 27, 1991, and published in the May, 1993, SMPTE Journal.

W.E. Glenn, "Digital Image Compression Based On Visual Perception, Digital Images & Human Vision", edited by Andrew B. Watson, (Cambridge: MIT Press, 1993) : 63 : 71.

* cited by examiner

COLOR VIDEO CAMERA METHOD AND SYSTEM

RELATED APPLICATIONS

The present Application claims is a continuation-in-part of U.S. patent application Ser. No. 09/152,395, filed Sep. 14, 1998, and the present Application also claims priority from U.S. Provisional Patent Application No. 60/094,499, filed Jul. 29, 1998 and from U.S. Provisional Patent Application No. 60/094,500, filed Jul. 29, 1998, and said Provisional Patent Applications are incorporated herein by reference.

FIELD OF THE INVENTION

This invention relates to producing television signals and, more particularly, to an improved method and apparatus for producing interlaced high definition color video signals representative of a scene.

BACKGROUND OF THE INVENTION

In my Published PCT International Patent Application PCT/US97/18351, published Apr. 18, 1998 (International Publication WO 98/16068), there is disclosed a type of camera that uses two image sensors and can produce an output of 1920×1080 pixels in color progressively scanned at 60 frames per second. [See, also, W. E. Glenn, and J. W. Marcinka, "1920 ×1080 Pixel Color Camera With A Progressive Scan Output AT 60 FPS," invited paper presented at SMPTE Technical Conference, New York, N.Y., Nov. 22, 1997.] This is the "top" format in the SMPTE 274M standard. Using progressive scan rather than interlace has been a long-term objective for program production for many years. Progressive scan is widely used in computers having high definition displays. As television and computer practices converge, progressive scan display becomes more desirable. Displays such as plasma panels and light valve systems require progressive scan if they are to have full brightness and optimum motion rendition. Such displays are becoming increasingly important for high definition television.

In operation of the referenced camera system, one sensor in the camera is a color stripe filter sensor that is scanned interlaced two lines at a time to produce the color signals and low resolution luminance. Within the camera, the top octave of detail is scanned out of a second sensor at 30 frames per second. An interlaced camera also takes ⅟₃₀ second to produce the top octave of vertical detail. Both cameras produce all other spatial frequencies at 60 frames per second. Consequently, motion rendition for the referenced camera is the same as that of an interlaced camera. This was verified subjectively by comparing the two types of cameras at 525 lines where cameras were commercially available and progressively scanned at 60 frames per second. [See, W. E. Glenn, and J. W. Marcinka, "The Development Of 1080× 1920 Pixel Color CCD Camera Progressively Scanned At 60 Frames Per Second," invited paper presented at SMPTE Technical Conference, Los Angeles, Calif., Oct. 9, 1996.]

The 1080P image derived from the referenced camera system does not have the interlace artifacts, and there is no interline flicker or line crawl. The vertical resolution is 1000 lines on a test chart, as compared with 700 lines for an interlaced camera. For a standard 1080I camera, the vertical resolution will still be 700 rather than 1000 lines. Signal scan converted from a 1080P camera or film scanned at 1080I would have the full 1000 line resolution. Because of the beneficial effect of alias frequencies produced by signals slightly above the Nyquist limit, the perceived resolution will be about 1300 lines.

In order to transmit a video signal that is within existing ATSC transmission standards, it would be desirable to have an output of the referenced camera system that is converted to interlaced format (e.g. to 1080I), and it is among the objects of the present invention to provide a camera system and method for producing such signals in interlaced format.

SUMMARY OF THE INVENTION

The present invention is directed to a method for generating interlaced video signals representative of color images of a scene, comprising the following steps: deriving a progressively scanned luminance signal representative of the scene at a first frame rate; deriving interlaced scanned color component signals and a color-derived luminance component representative of the scene; high pass filtering and scan converting the luminance signal to obtain an interlaced detail luminance component; low pass filtering the interlaced color component signals and color-derived luminance component to obtain interlaced chrominance output signals and an interlaced low pass luminance component; and combining the detail luminance component and the low pass luminance component to obtain an interlaced luminance output signal.

In a preferred embodiment of the invention, the scan converting of the luminance signal comprises progressive to interlace conversion at half the progressive clock rate.

Further features and advantages of the invention will become more readily apparent from the following detailed description when taken in conjunction with the accompanying drawings.

DETAILED DESCRIPTION

Figure 1:
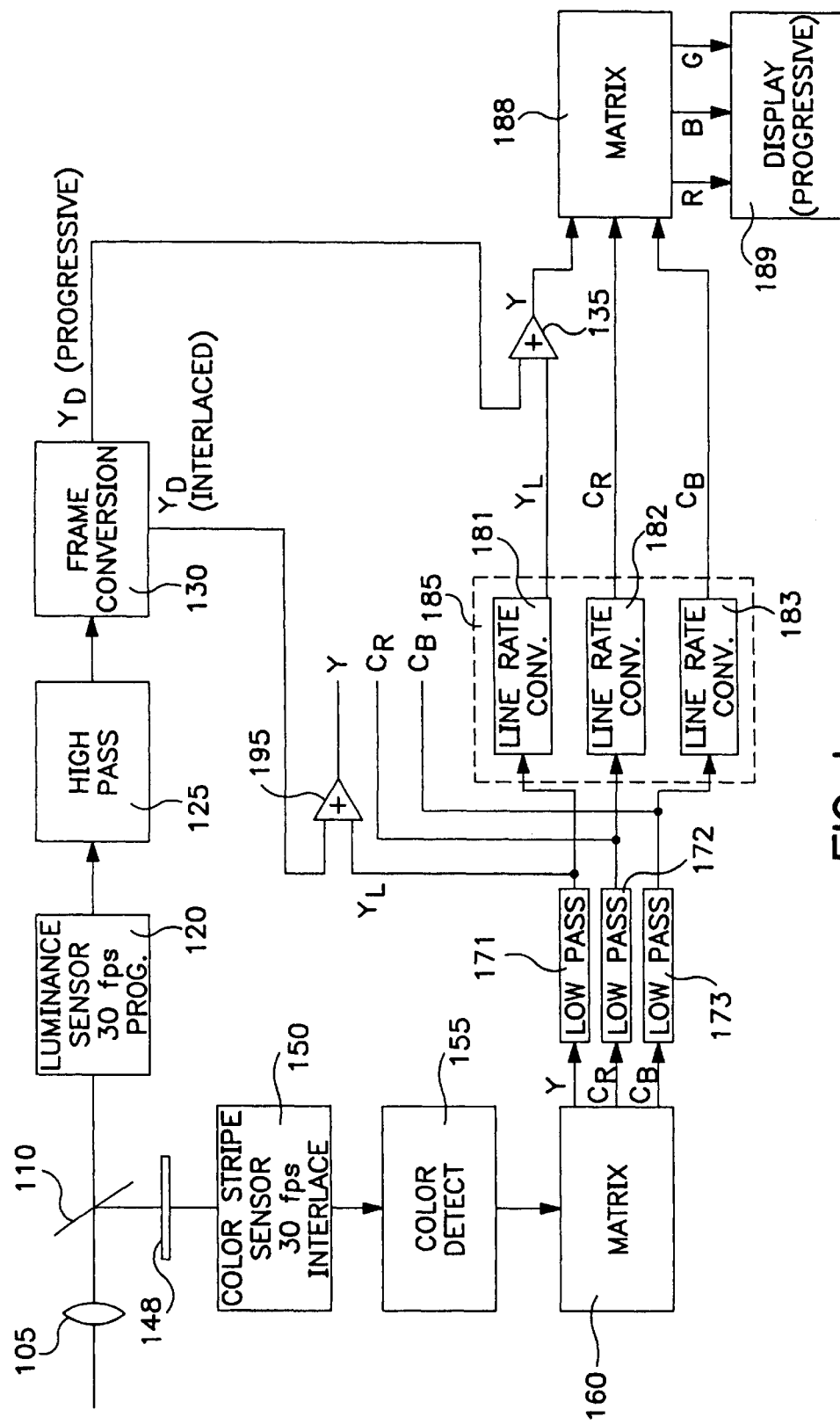
FIG. 1 is a diagram, partially in schematic and partially in block form, of a camera system in accordance with an embodiment of the invention, that can produce interlaced color video signals. These signals can be subsequently processed using an embodiment of the invention disclosed in the parent application hereof.

FIG. 1 shows, inter alia, a camera system of the type set forth in my Published PCT International Application PCT/US97/18351 published Apr. 16, 1998 (International Publication WO 98/16068), which can produce for example a 1080 progressive video signal. The camera system has been modified, in accordance with an embodiment of the invention, to produce an interlaced video signal, for example a 1080 interlaced video signal. Light received from a scene being viewed (i.e., a scene which can be moving) is focused by a camera lens system, represented at 105, through a splitter, e.g. a half-silvered mirror 110, onto image sensors 120 and 150, respectively. The sensor 120, in this example, has 1080 lines and 1920 pixels per line, and is progressively scanned at 30 frames per second. The output of CCD sensor 120 is coupled to a high pass spatial filter 125, the output of which is coupled to a frame rate conversion circuit 130. It is known, in general, that a frame of video information can be digitized and clocked in at one rate (e.g. 30 frames per second, in the example of the present embodiment) and clocked out at a higher rate (e.g. 60 frames per second, in the example of the present embodiment) by using frame stores that clock out at twice the rate at which they are clocked in, with each original frame being clocked out twice during one original frame period. A type of circuit that can be employed is disclosed in the above referenced International Publication No. WO 98/16068. Reference can also be made to my U.S. Pat. No. 4,701,783. In the present example, the line rate of the converted frames is 1080 visible lines per frame times 60 frames per second, which equals 64,800 visible lines per second. [The full line rate for this case will be 1125 lines per frame, which gives 67,500 total lines per second.] The output of the frame rate conversion circuit 130, designated $Y_D$, is coupled to one input of a summing circuit 135. The other sensor 150 of the FIG. 1 example is another CCD sensor, having the same 1920 by 1080 pixel and line structure, but operated with color stripes, as is known in the art for producing color component signals. In the optical path of this sensor, an optical low-pass filter (represented at 148) can be interposed to prevent alias frequencies from being generated by the low spatial frequency sampling. In the example of FIG. 1, the sensor 150 is operated to be scanned at 30 interlaced frames per second. The output of sensor 150 is coupled to the block 155 and then block 160, which respectively represent conventional types of circuits for color detection (block 155) and for generating luminance and color difference signals (the matrix of block 160). The outputs of matrix circuit 160, in the present example, are a luminance signal, designated Y, and chrominance components $C_R$ and $C_B$ (which can be color difference signals R-Y and B-Y, respectively). Each of these signals is coupled to a respective low-pass spatial filter, the filters being respectfully designated 171, 172 and 173. The outputs of the low-pass spatial filters are coupled to respective line rate conversion circuits 181, 182 and 183 (collectively labelled as scan conversion circuit 185, in dashed line), which are described in further detail in the above referenced International Publication No. WO 98/16068. In the present example, each line is clocked out at twice its original rate for two successive lines, so the result will be 60 progressive frames of 1080 visible lines each; i.e., again a line rate of 64,800 visible lines per second (and a full line rate of 67,500 lines per second). Line interpolation can be used to advantage in the conversion. [In this example, and in similar configurations, it will be understood that there must be a line reverse to account for the mirror image resulting from mirror 110. If this is not implemented by reading out the sensor lines in reverse order, it can be readily performed by clocking out on a last in first out basis in the line rate conversion circuit.] The output of line rate conversion circuit 181 is coupled to a second input of summing circuit 135 which produces an output luminance signal designated Y. The signals Y, $C_B$, and $C_R$ can be matrixed using matrix circuit 188 to obtain R, G, B color signals for display using 1080 line progressive display. It will be understood that appropriate compensating delay can be provided in one or both channels, as required.

In operation of the FIG. 1 camera system as described so far (see also the referenced International Publication No. WO 98/16068), it is seen that the described system and technique achieves color video signals at the higher progressive scan rate (60 frames per second, progressive, in this example), at the full line capability of the sensors used, and without undue introduction of artifacts. In the output of the camera system, everything but the top octave of luminance detail is updated at 60 frames per second. The detail information is updated at 30 frames per second (as it is in interlaced scans, but without the interlace artifacts).

In accordance with an embodiment of a form of the present invention, the camera system of FIG. 1 can also be used to produce interlaced video signals without noticeable motion artifacts when displayed using the receiver converter disclosed in the parent application hereof. Specifically, an interlaced video signal output includes the interlaced lower band chrominance signals $C_R$ and $C_B$, as well as a luminance signal Y that is the sum (see adder 195) of the lower band color-derived luminance component, $Y_L$, and the high band (detail) luminance component, $Y_D$, obtained by conversion to interlace at half the clock rate (e.g. using a frame store in conversion circuit 130), with the odd lines being clocked out during one field and the even lines clocked out during the next field.

The parent application hereof, incorporated herein by reference, describes an interlaced to progressive receiver converter that can be utilized to process the interlaced signals generated using the above described technique and apparatus.

What is claimed is:

1. A method for generating interlaced video signals representative of color images of a scene, comprising the steps of:
    deriving a progressively scanned luminance signal representative of said scene at a first frame rate;
    deriving interlaced scanned color component signals and a color-derived luminance component representative of said scene;
    high pass filtering and scan converting said luminance signal to obtain an interlaced detail luminance component;
    low pass filtering said interlaced color component signals and color-derived luminance component to obtain interlaced chrominance output signals and an interlaced low pass luminance component; and
    combining said interlaced detail luminance component and said interlaced low pass luminance component to obtain an interlaced luminance output signal.

2. The method as defined by claim 1, wherein said scan converting of said luminance signal comprises progressive to interlace conversion at half the progressive clock rate.

3. The method as defined by claim 1, further comprising recording and/or transmitting said interlaced chrominance output signals and said interlaced luminance output signal.

4. The method as defined by claim 2, further comprising recording and/or transmitting said interlaced chrominance output signals and said interlaced luminance output signal.

5. Apparatus for generating interlaced video signals representative of color images of a scene, comprising:
    means for deriving a progressively scanned luminance signal representative of said scene at a first frame rate;
    means for deriving interlaced scanned color component signals and a color-derived luminance component representative of said scene;
    means for high pass filtering and scan converting said progressively scanned luminance signal to obtain an interlaced detail luminance component;
    means for low pass filtering said interlaced scanned color component signals and color-derived luminance component to obtain interlaced chrominance output signals and an interlaced low pass luminance component; and
    means for combining said interlaced detail luminance component and said interlaced low pass luminance component to obtain an interlaced luminance output signal.

6. Apparatus as defined by claim 5, wherein said means for high pass filtering and scan converting said progressively scanned luminance signal comprises means for implementing progressive to interlace conversion at half the progressive clock rate.

* * * * *